United States Patent
Hermle et al.

(10) Patent No.: US 12,451,753 B2
(45) Date of Patent: Oct. 21, 2025

(54) ELECTRIC MACHINE WITH DIRECTLY COOLED WINDINGS

(71) Applicant: Airbus (S.A.S.), Blagnac (FR)

(72) Inventors: Frank Hermle, Aying (DE); Michael Hofmann, Neubiberg (DE); Jorge A. Carretero Benignos, Garching bei München (DE)

(73) Assignee: Airbus (S.A.S.), Blagnac (FR)

( * ) Notice: Subject to any disclaimer, the term of this patent is extended or adjusted under 35 U.S.C. 154(b) by 243 days.

(21) Appl. No.: 18/212,911

(22) Filed: Jun. 22, 2023

(65) Prior Publication Data
US 2023/0421015 A1 Dec. 28, 2023

(30) Foreign Application Priority Data
Jun. 23, 2022 (EP) .................................... 22180859

(51) Int. Cl.
*H02K 5/20* (2006.01)
*H02K 3/28* (2006.01)

(52) U.S. Cl.
CPC .................. *H02K 5/20* (2013.01); *H02K 3/28* (2013.01)

(58) Field of Classification Search
CPC ............ H02K 5/20; H02K 5/203; H02K 1/20; H02K 3/28; H02K 3/24; H02K 1/32; H02K 3/22
USPC .......................................................... 310/89
See application file for complete search history.

(56) References Cited

U.S. PATENT DOCUMENTS

| 2019/0229599 A1* | 7/2019 | Xu | ......................... H02K 21/16 |
| 2020/0169136 A1* | 5/2020 | Sercombe | ............ H02K 21/16 |

FOREIGN PATENT DOCUMENTS

| DE | 102016216019 A1 * | 3/2018 | |
| EP | 2068426 A1 | 6/2009 | |
| EP | 1593191 B1 * | 9/2010 | ............... H02K 3/24 |
| EP | 3940925 A1 * | 1/2022 | ............... H02K 3/24 |
| WO | WO-2022094003 A1 * | 5/2022 | ............. H02K 1/148 |

OTHER PUBLICATIONS

Machine Translation of DE_102016216019_A1 (Year: 2018).*
European Search Report for Application No. 22180859 dated Nov. 22, 2022.

* cited by examiner

*Primary Examiner* — Alexander A Singh
*Assistant Examiner* — Charlie Frank Mann, Jr.
(74) *Attorney, Agent, or Firm* — KDW Firm PLLC

(57) ABSTRACT

An electric machine includes windings for creating electromagnetic fields and at least one fluid-tight internal housing. The group of windings is in an interior space of one of the at least one internal housing. Each of the at least one group of the windings includes at least two electric connecting sections for connecting the respective group of the windings to an external electrical circuit, wherein the at least two electric connecting sections reach from the interior space through a wall of the respective internal housing to outside the respective internal housing, wherein the at least one internal housing includes a coolant inlet and a coolant outlet, and wherein neighboring windings of the at least one group of the windings enclose gaps between each other, the gaps being in fluid communication with the respective coolant inlet and the coolant outlet to be flown through by a coolant.

13 Claims, 3 Drawing Sheets

ELECTRIC MACHINE WITH DIRECTLY COOLED WINDINGS

TECHNICAL FIELD

The disclosure herein relates to an electric machine and a vehicle having such an electric machine.

BACKGROUND

Electric machines usually comprise a set of windings for creating electromagnetic fields. As the efficiency in conversion of electrical power into electromagnetic power is less than 100%, heat is created when operating an electric machine. Various cooling systems for electric machines are known. For example, a housing of the electric machine has an arrangement of fins that dissipate heat into the environment through convection. In addition, fans may be used for forced convection. Furthermore, the integration of cooling channels into the enclosure or parts of it is known, through which a coolant is pumped.

In another concept, the windings of the electric machine are hollow, and are cooled by an internal flow of a dielectric fluid. This brings the coolant in direct contact with the windings bypassing the thermal resistances of a cooling jacket, a stator, or other components. At the same time, this increases the contact area of the coolant, therefore raising the cooling capacity and the maximum current density that can be carried by the windings before their electrical insulation degrades. A major limitation lies in the small diameter of the flow channel inside the wire, leading to a mainly laminar coolant flow, as well as the limited material thickness of the wires, leading to increased electric losses. The laminar flow leads to a low Nusselt number, which is a non-dimensional convective heat transfer coefficient. In order to reach a turbulent flow for improved heat transfer, the mass flow rate needs to be extremely high when maintaining the small diameters of the wires.

SUMMARY

It is an object of the disclosure herein to propose an alternative electric machine with improved cooling.

This object is met by an electric machine having features disclosed herein. Advantageous embodiments and further improvements may be gathered from the following description.

An electric machine is disclosed, comprising a plurality of windings for creating electromagnetic fields, and at least one fluid-tight internal housing, wherein at least one group of the windings is arranged in an interior space of one of the at least one internal housing, wherein each of the at least one group of the windings comprises at least two electric connecting sections for connecting the respective group of the windings to an external electrical circuit, and wherein the at least two electric connecting sections reach from the interior space through a wall of the respective internal housing to outside the respective internal housing, wherein the at least one internal housing comprises a coolant inlet and a coolant outlet, and wherein neighboring windings of the at least one group of the windings enclose gaps between each other, wherein the gaps are in fluid communication with the respective coolant inlet and the coolant outlet to be flown through by a coolant.

The electric machine may preferably be an electric motor, a generator, a motor generator unit, or any other device that comprises a plurality of windings for creating electromagnetic fields. A gist of the disclosure herein lies in providing a direct cooling of windings for achieving a clearly improved heat dissipation, and thus allowing clearly improved current densities. In the following, several aspects of the disclosure herein are described in further detail.

The electric machine according to the disclosure herein may comprise an enclosure, such as a housing, which is the outer hull of the electric machine and may enable an attachment of the electric machine to its installation space. The enclosure may comprise a closed surface or, for weight saving reasons, one or several openings or recesses. However, such an enclosure is not absolutely required.

The electric machine according to the disclosure herein comprises at least one fluid-tight internal housing, in which a group of the plurality of windings is placed. This internal housing has a coolant inlet and a coolant outlet. A coolant may be supplied at the coolant inlet, such that it flows into the interior space of the respective internal housing. Due to its fluid-tight design, the coolant remains inside the interior space or exits the interior space through the coolant outlet. If a continuous supply of coolant is provided, a continuous flow of coolant from the coolant inlet to the coolant outlet through the internal housing occurs. The group of windings that is arranged inside the internal space is thus continuously impinged by a flow of coolant, which absorbs heat of the windings and carries the heat out of the internal space.

The group of windings is electrically connectable to an exterior electric circuit, which may exemplarily feed an alternating current to the windings, such that may produce an alternating electromagnetic field for providing the intended function of the electric machine. The at least two electric connecting sections are arranged outside the internal space of the interior housing. It is to be understood that holes or recesses for passing the windings through the respective wall to the outside of the internal housing are sealed against the windings. In other words, the part of the group of windings inside the internal housing are hermetically sealed and can be operated through at least two electric connecting sections outside the internal housing.

For providing an excellent heat transfer, neighboring windings enclose gaps between each other. Depending on the number and design of the windings, the shape, size, and number of gaps may differ. For example, the windings may be linear windings, i.e. wires that have a thin, e.g. circular, cross-section and are arranged along helical lines, such that a strand of wires is created arranged in a plurality of circulations. In this strand of wires, the wires are distanced to each other, such that at least in a part of strand the wires do not touch each other. This may lead to a matrix-like arrangement of the wires in the strand, in a viewing direction perpendicular to the wires. As an alternative, flat windings are conceivable, which are arranged parallel to each other, such that their flat sides face each other. They may enclose gaps between the flat sides, which will then be flown-through by the coolant. Of course, these are merely examples, and further embodiments are feasible.

This design clearly increases the convective heat transfer coefficient of the coolant in comparison to the previously known designs mentioned above. The flow inside the internal housing may preferably be turbulent for clearly improved heat transfer, wherein the turbidity does not depend on the diameter of wires. Thus, the wires and the coolant supply may be designed or selected independently from each other to prevent excessive power losses and reduced required power for a coolant pump. By letting the coolant flow on the outside of each winding or small set of windings multiple degrees of freedom to increase the heat transfer, improve the cooling capacity for the windings, and increase the electric current density and therefore the power density of the electric motor arise. The separation of the windings from each other can be chosen depending on the design of the windings and their layout. To sum up, the contact area and the magnitude of the convective heat transfer coefficient as well as gaining the ability to optimize the flow as needed for each location is achieved by the disclosure herein. In this design, the windings may be as small as a few microns and therefore scape the electric losses.

In an advantageous embodiment, the at least one internal housing comprises at least one internal wall that creates at least one flow channel inside the respective internal housing. Preferably, a plurality of internal walls is provided for defining a path, along which the coolant flows. If the internal housing would comprise only a coolant inlet and a coolant outlet, the coolant flow would be rather arbitrary. The internal walls, which are preferably fluid-impermeable, urge the coolant flow from the coolant inlet to the coolant outlet to extend along and around the internal walls. Upon desire, a meandering flow in at least one direction, a spiral flow, a flow path in the form of the letter U, and other shapes and patterns can be created. It is conceivable that the at least one internal wall comprises an opening, through which at least a part of the flow can pass, such that the at least one internal wall may be attached to two opposite sides in the internal housing.

In an advantageous embodiment, the respective group of windings at least partially extends through the at least one internal wall. Thus, the at least one internal wall may comprise one or a plurality of recesses or openings, through which the windings can extended. The at least one internal wall may thus extend between two opposite sides of the respective internal housing and provide as a mechanical stiffening element.

In an advantageous embodiment, the at least one internal wall is designed for creating a meandering flow of the coolant. Thus, a plurality of internal walls may be present that repeatedly redirect the flow between two opposite directions.

In an advantageous embodiment, the at least one internal wall holds at least a part of the respective windings. For separating the windings from each other, they need to be held in a distance from each other. The at least one internal wall may comprise a plurality of openings or recesses, through which the respective windings extend, wherein the openings or recesses define their spatial orientation, depending on their design. The internal walls may be integrated directly into the windings during their manufacture.

In an advantageous embodiment, the coolant inlet and the coolant outlet are arranged at the same side of the at least one internal housing. Thus, the installation effort for providing a coolant supply line and a coolant removal line is reduced. The coolant-conducting parts of the electric machine may thus be concentrated to a single section, which may increase the degree of freedom to install the electric machine into a dedicated installation space.

In an advantageous embodiment, at least one turbulator is arranged in the respective interior space for creating a turbulent flow. The at least one turbulator may comprise sharp edges or another geometric feature for creating vortices that improve a heat transfer of the coolant. The at least one turbulator may be separated from the at least one internal wall or it may be integrated therein.

In an advantageous embodiment, the windings are linear windings and extend along a plurality of helical lines, wherein the windings of consecutive circulations are arranged at a distance to each other. Hence, the windings are separated from each other at least in the axial or a radial direction. Linear windings may comprise a small diameter of e.g. less than a millimeter and provide a comparably considerable number of circulations.

In an advantageous embodiment, the windings comprise a plurality of different diameters, wherein the windings of consecutive circulations in radial or axial direction are distanced in radial or axial direction. Here, both a radial and axial separation of consecutive windings is possible and the above mentioned matrix-shaped arrangement of wires can be achieved.

In an advantageous embodiment, the windings are flat and extend along a somewhat angular helical line, wherein the windings of consecutive circulations are arranged at a distance to each other. The use of flat windings may comprise some advantages, such as a lower electric resistance, a higher inductance, as well as a reduction of heat created during the operation of the electric machine. The current density in these flat windings may even be increased with using the coolant flow as described herein.

In an advantageous embodiment, the electric machine may further comprise a coolant source connected to the respective coolant inlet, wherein the coolant source comprises oil, or de-ionized water as a coolant. Thus, the coolant is externally supplied and may be a dielectric fluid in the form of oil. Thus, a sophisticated isolation of the windings to prevent an electrical contact between the windings through the coolant is not required. However, a thin insulation layer may be provided on the windings, e.g. through an anodization. Then, also water or any other fluid may be used as a coolant. Furthermore, also hydrogen may be used as a coolant. For example, it is known to use low-temperature gaseous hydrogen for cooling in hollow alternator windings for highest-power alternators in power plants.

In an advantageous embodiment, the at least one internal housing comprises a plurality of internal housings, wherein the internal housings together constitute a hollow cylindrical shape. Thus, the internal housings each are a single section of the hollow cylindrical shape, wherein all internal housings attached together to place their longitudinal, axial edge surfaces in flush contact creates the hollow cylinder.

In an advantageous embodiment, the electric machine further comprises a central coolant inlet coupled with the coolant inlets through a first manifold, and further comprises a central coolant outlet coupled with the coolant outlets through a second manifold. The manifolds may exemplarily comprise a ring shape with a central coolant inlet or a central coolant outlet as well as connecting ports for all coolant inlets or coolant outlets of the electric machine. The manifolds serve for distributing the supplied coolant to all internal housings or to collect the returning coolant from all internal housings to the central coolant outlet.

The disclosure herein further relates to a vehicle, comprising at least one electric machine according to the above.

In an advantageous embodiment, the vehicle is an aircraft. The electric machine may be an electric motor for aerospace propulsive and non-propulsive applications. For example, electric vertical-takeoff-and-landing vehicles (EVOTL), electrically driven aircraft, e.g. having hydrogen-supplied fuel cells, or other aircraft may utilize such an electric machine. Also, peripheral systems inside a conventional aircraft may use such an electric machine. The advantages lie in the improved efficiency, more compact design and thus reduced weight and installation space requirements.

BRIEF DESCRIPTION OF THE DRAWINGS

In the following, the attached drawings are used to illustrate example embodiments in more detail. The illustrations are schematic and not to scale. Identical reference numerals refer to identical or similar elements. They show.

DETAILED DESCRIPTION

Figure 1:
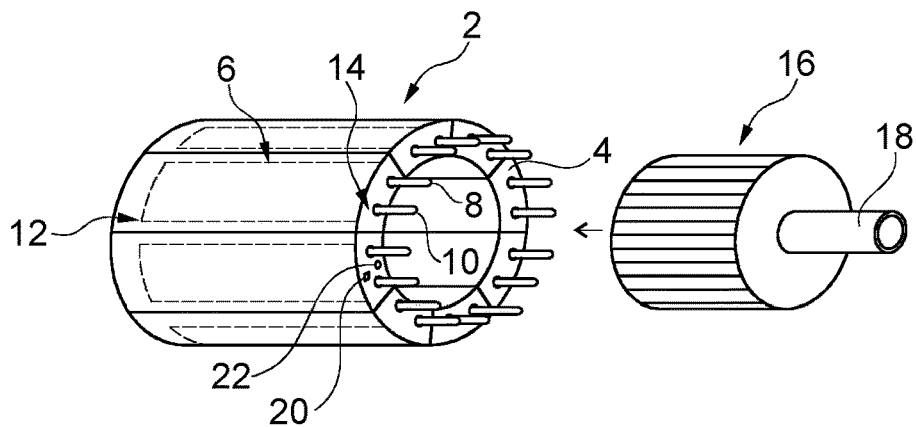
FIG. 1 shows a schematical illustration of a part of an electric machine.

FIG. 1 shows a part of an electric machine 2, which comprises a plurality of fluid-tight internal housings 4, in which a plurality of windings 6 are arranged. Each of the windings 6 comprises a first electric connecting section 8 and a second electric connecting section 10 reaching from inside an interior space 12 through a wall 14 of the respective internal housing 4 to its outside. The electric connecting section 8 and 10 serve for connecting the windings 6 to an exterior electric circuit in order to form electromagnetic fields inside the electrical machine 2. The electric machine 2 may be an electric motor, wherein the internal housings 4 together with the windings 6 create a stator, wherein a rotor 16 is arranged inside the stator and comprises a shaft 18.

Each of the internal housings 4 comprises a coolant inlet 20 and a coolant outlet 22 for supplying a flow of coolant through the interior housing 4 to directly impinge the windings 6 for cooling purposes. For the sake of simplification, only one of the internal housings 4 shown in FIG. 1 illustrates the coolant inlet 20 and the coolant outlet 22. The internal housing 4 is fluid-tightly designed to avoid leakage.

Figure 2:
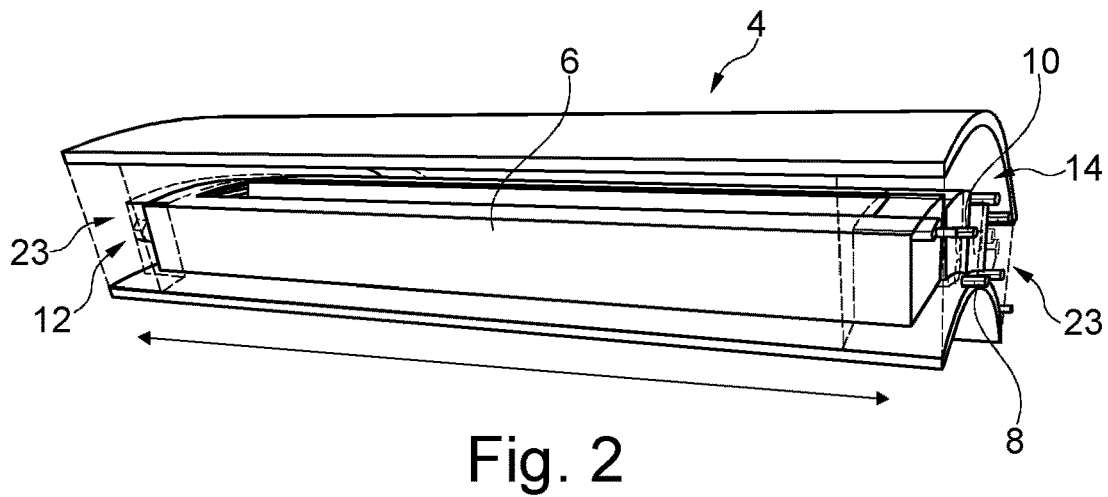
FIG. 2 shows an internal housing in a three-dimensional view.

FIG. 2 shows one of the internal housings 4 with windings 6 arranged therein. Here, the windings 6 are completely enclosed by the internal housing 4 and only the connecting sections 8 and 10 protrude to the outside. The internal housing 4 also has two angled side surfaces 23, which are designed for abutting with other side surfaces 23 of other internal housings 4 to mutually create a hollow-cylindrical shape as shown in FIG. 1.

Figure 3:
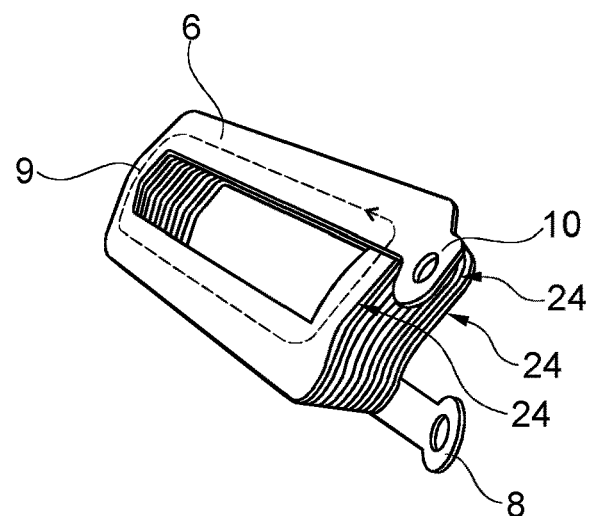
FIG. 3 shows flat windings to be integrated into an internal housing.

FIG. 3 shows an example design of the windings 6, which in this case are provided as flat windings with a plurality of circulations 9. Here, the windings 6 enclose gaps 24 between each other, wherein the gaps 24 are arranged between flat sides of the windings 6. The coolant flowing into the interior space 12 flows through the gaps 24 and absorbs heat emanated by the windings 6. Compared to other known designs, the heat conducting surface is clearly increased.

Figure 4:
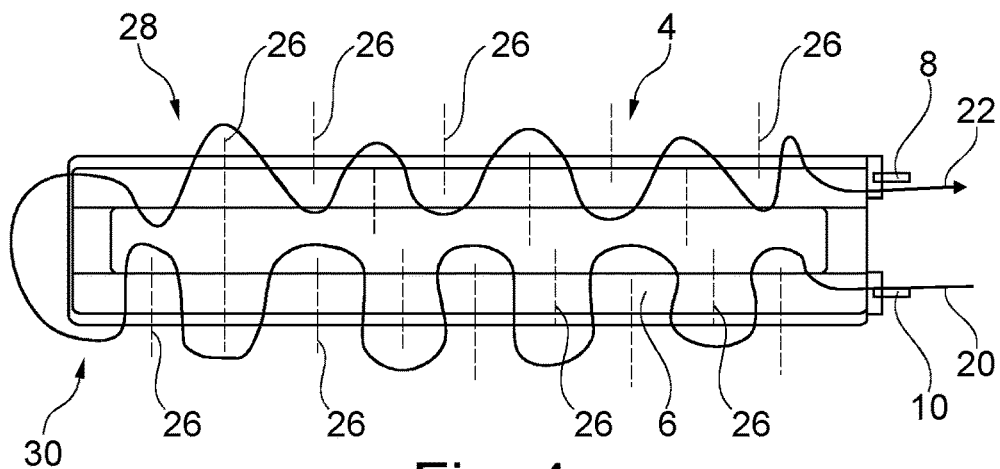
FIG. 4 schematically shows a meandering flow through windings.

FIG. 4 shows a top view of an internal housing 4 with windings 6 arranged therein. Here, exemplarily several internal walls 26 are provided that only partially extend between two opposite sides 28 and 30 of the housing 4 and thus define a meandering flow path between the coolant inlet 20 and 22. The flow may thus be turbulent at least in a region and the flow path is extended. Thus, the heat conduction is even further improved.

Figure 5:
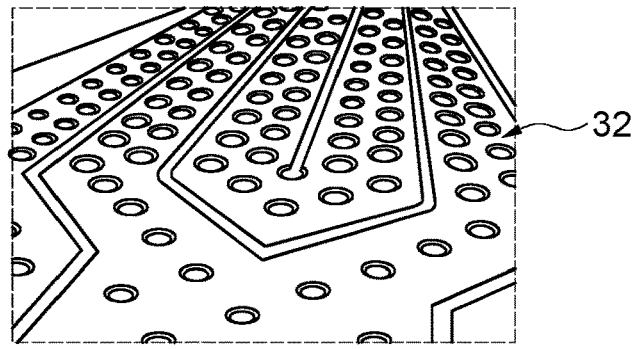
FIG. 5 shows a dimpled surface of flat windings.

FIG. 5 shows an alternative or an addition thereto. A surface 32 of the flat windings 6 may be dimpled, such that the coolant flow over the surface 32 becomes turbulent and thus improves the heat conduction. The dimpled surface 32 may thus act as a turbulator. Other turbulators may be arranged inside the interior space 12 that act on the flow.

Figure 6:
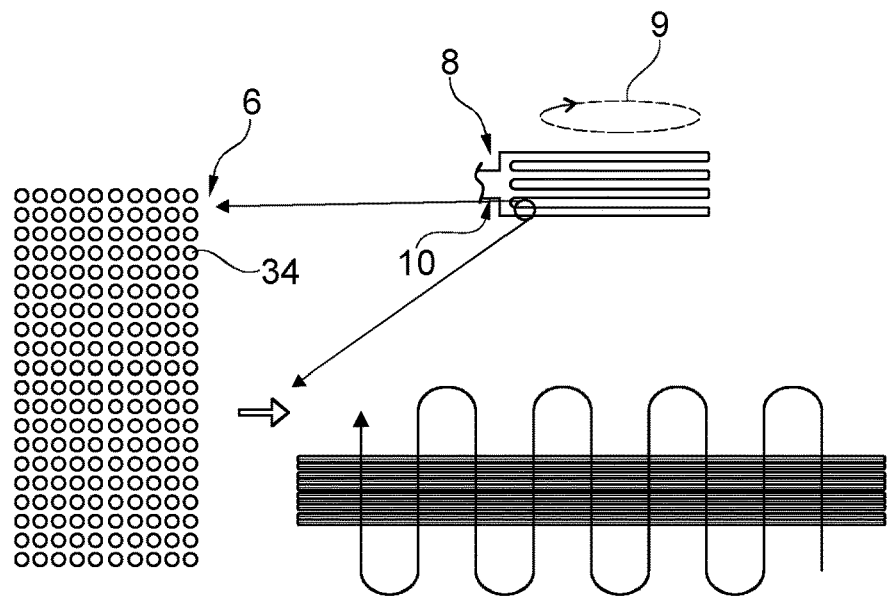
FIG. 6 schematically shows a strand of wires that constitute windings for an electric machine.

In FIG. 6, linear windings 6 are shown, which are provided in the form of strands comprising a plurality of linear wires 34, wherein the strands extend along a plurality of circulations 9. The wires 34 are arranged at a distance to each other within the strand, such that a cross-section of the respective strand has a matrix-shape with the cross sections of the wires 34 constituting the matrix elements. The windings may also be flown through by a meandering flow.

Figure 7:
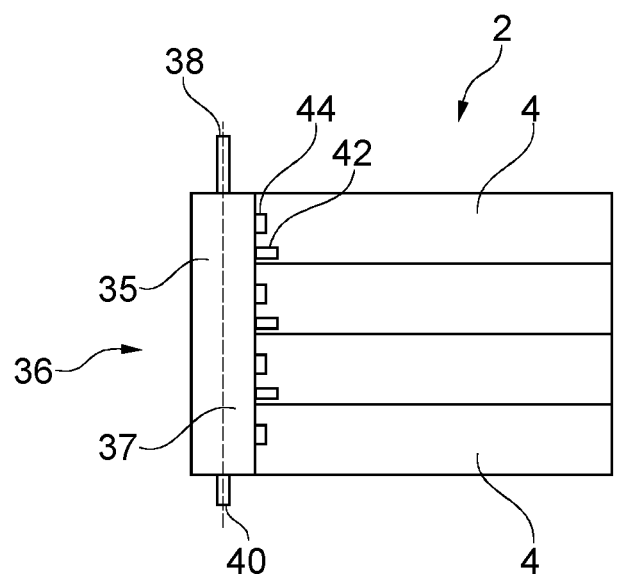
FIG. 7 schematically shows a manifold arrangement.

FIG. 7 shows the electric machine 2, which further comprises a manifold arrangement 36 having a first manifold 35 and a second manifold 37. The manifold arrangement 36 has a central coolant inlet 38 and a central coolant outlet 40 and provides for the function of an inlet manifold in the form of the first manifold 35 and an outlet manifold in the form of the second manifold 37. The manifold arrangement 36 has several individual coolant outlets 42 coupled with the coolant inlets in the individual internal housings 4 and several individual coolant inlets 42 coupled with the coolant outlets 22 in the individual internal housings. This illustration is merely schematic and is focused mainly on the coolant transfer and electrical features are left out for the purpose of simplification.

Figure 8:
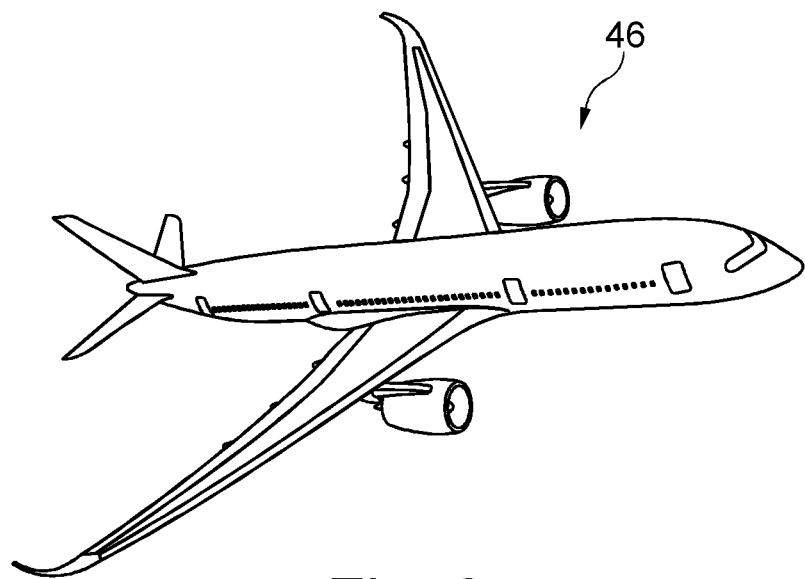
FIG. 8 schematically shows an aircraft having at least one electric machine.

FIG. 8 shows an aircraft 46 having at least one such electric machine 2. While the electric machine 2 may be used in any peripheral device inside the aircraft 46 it may also support or realize the generation of thrust.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 electric machine
4 internal housing
6 winding
8 first electric connecting section
9 circulation
10 second electric connecting section
12 interior space
14 wall
16 rotor
18 shaft
20 coolant inlet
22 coolant outlet
24 gap 26 internal wall
28 side of the internal housing
30 side of the internal housing
32 surface
34 linear wire
36 manifold arrangement
38 central coolant inlet
40 central coolant outlet
42 individual coolant outlet
44 individual coolant inlet
46 aircraft

The invention claimed is:

1. An electric machine, comprising:
a plurality of windings for creating electromagnetic fields; and
at least one fluid-tight internal housing;
wherein at least one group of the windings is in an interior space of one of the at least one internal housing;
wherein each of the at least one group of the windings comprises at least two electric connecting sections for connecting a respective group of the windings to an external electrical circuit, and wherein the at least two electric connecting sections reach from the interior space through a wall of a respective internal housing of the at least one internal housing to outside the respective internal housing;
wherein the at least one internal housing comprises a coolant inlet and a coolant outlet;
wherein neighboring windings of the at least one group of the windings define gaps between each other, wherein the gaps are in fluid communication with a respective coolant inlet and the coolant outlet to be flown through by a coolant;
wherein the at least one internal housing comprises internal walls that each respectively create at least one flow channel inside the respective internal housing;
wherein the respective group of windings at least partially extends through the internal walls;
wherein the internal walls are respectively configured for creating a meandering flow of the coolant; and
wherein several of the internal walls only partially extend between two opposite sides of the housing and define a meandering flow path between the coolant inlet and the coolant outlet, the several internal walls repeatedly redirecting the flow between two opposite directions.

2. The electric machine according to claim 1, wherein the internal walls hold at least a part of the respective windings.

3. The electric machine according to claim 1, wherein the coolant inlet and the coolant outlet are at a same side of the at least one internal housing.

4. The electric machine according to claim 1, comprising, in the interior space of one of the at least one internal housing, at least one turbulator for creating a turbulent flow of the coolant.

5. The electric machine according to claim 1, wherein:
the windings are linear windings and extend along a plurality of helical lines; and
the windings of consecutive circulations are arranged at a distance from each other.

6. The electric machine according to claim 5, wherein:
the windings comprise a plurality of different diameters; and
the windings of consecutive circulations in a radial direction or an axial direction are distanced in the radial direction or the axial direction.

7. The electric machine according to claim 1, wherein;
the windings are flat and extend along a somewhat angular helical line; and
the windings of consecutive circulations are arranged at a distance from each other.

8. The electric machine according to claim 1, further comprising a coolant source connected to the respective coolant inlet;
wherein the coolant source comprises oil or de-ionized water as the coolant.

9. The electric machine according to claim 1, wherein:
the at least one internal housing comprises a plurality of internal housings, and
the plurality of internal housings together constitute a hollow cylindrical shape.

10. The electric machine according to claim 9, further comprising:
a central coolant inlet coupled with the coolant inlet of each of the plurality of internal housings through a first manifold; and
a central coolant outlet coupled with the coolant outlet of each of the plurality of internal housings through a second manifold.

11. A vehicle comprising at least one of the electric machine according to claim 1.

12. The vehicle according to claim 11, wherein the vehicle is an aircraft.

13. The electric machine according to claim 1, wherein an outer surface of the plurality of windings comprises dimples that are configured to increase turbulence of the coolant flowing over the dimples.

* * * * *